(12) United States Patent
Roth

(10) Patent No.: US 12,024,249 B2
(45) Date of Patent: Jul. 2, 2024

(54) TRANSPORT WAGON

(71) Applicant: Artiq B.V., Hengelo (NL)

(72) Inventor: Arjen Roth, Hengelo (NL)

(73) Assignee: Artiq B.V., Hengelo (NL)

(*) Notice: Subject to any disclaimer, the term of this patent is extended or adjusted under 35 U.S.C. 154(b) by 508 days.

(21) Appl. No.: 17/428,859

(22) PCT Filed: Feb. 20, 2020

(86) PCT No.: PCT/NL2020/050103
§ 371 (c)(1),
(2) Date: Aug. 5, 2021

(87) PCT Pub. No.: WO2020/171707
PCT Pub. Date: Aug. 27, 2020

(65) Prior Publication Data
US 2022/0119055 A1    Apr. 21, 2022

(30) Foreign Application Priority Data
Feb. 21, 2019  (NL) ...................................... 2022608

(51) Int. Cl.
*B62D 63/06* (2006.01)
*B62D 21/20* (2006.01)
(Continued)

(52) U.S. Cl.
CPC .......... *B62D 63/061* (2013.01); *B62D 21/20* (2013.01); *B62D 53/005* (2013.01); *B62D 61/04* (2013.01)

(58) Field of Classification Search
CPC ...... B62D 21/20; B62D 53/005; B62D 61/04; B62D 63/061
(Continued)

(56) References Cited

U.S. PATENT DOCUMENTS

| 3,944,258 A | 3/1976 | Christensen |
| 2011/0101649 A1 | 5/2011 | Harding |

FOREIGN PATENT DOCUMENTS

| CA | 660099 A | 3/1963 |
| DE | 202006006289 U1 | 6/2006 |

(Continued)

OTHER PUBLICATIONS

International Search Report and Written Opinion received fro PCT Serial No. PCT/NL2020/050103 on Sep. 10, 2020, 10 pgs.

*Primary Examiner* — Tony H Winner
*Assistant Examiner* — Felicia L. Brittman
(74) *Attorney, Agent, or Firm* — Glen E. Schumann; Moss & Barnett

(57) ABSTRACT

The present invention relates to a transport wagon consisting of a base frame, wherein the base frame comprises a rotatable bogie assembly on its front side for attachment to a powered tow or push truck and comprises one or more front steering wheels placed on the front side of the base frame and one or more rear steering wheels placed on the rear side of the base frame, wherein the one or more front steering wheels and the one or more rear steering wheels are coupled in such a way to the rotatable bogie assembly, that in operation the one or more front steering wheels rotate along with the rotatable bogie assembly and that the one or more rear steering wheels rotate in opposite direction with respect to the rotatable bogie assembly, wherein the base frame comprises at least one longitudinal beam to which a front cross beam, a rear cross beam and at least one intermediate cross beam are arranged with intermediate spaces, wherein at least one intermediate space is arranged for receiving goods, wherein an intermediate wheel suspension with two or more intermediate wheels is arranged under one or more of the intermediate cross beams. The present (Continued)

transport wagon provides a transport wagon that remains well steerable on uneven floors.

8 Claims, 5 Drawing Sheets

(51) Int. Cl.
*B62D 53/00* (2006.01)
*B62D 61/04* (2006.01)

(58) Field of Classification Search
USPC .......................................................... 280/408
See application file for complete search history.

(56) References Cited

FOREIGN PATENT DOCUMENTS

| | | | | |
|---|---|---|---|---|
| DE | 102008035914 A1 | 2/2010 | | |
| EP | 1743828 A1 | 1/2007 | | |
| FR | 3002912 A1 * | 9/2014 | ............ | B60R 19/38 |
| GB | 786221 A | 11/1957 | | |

* cited by examiner

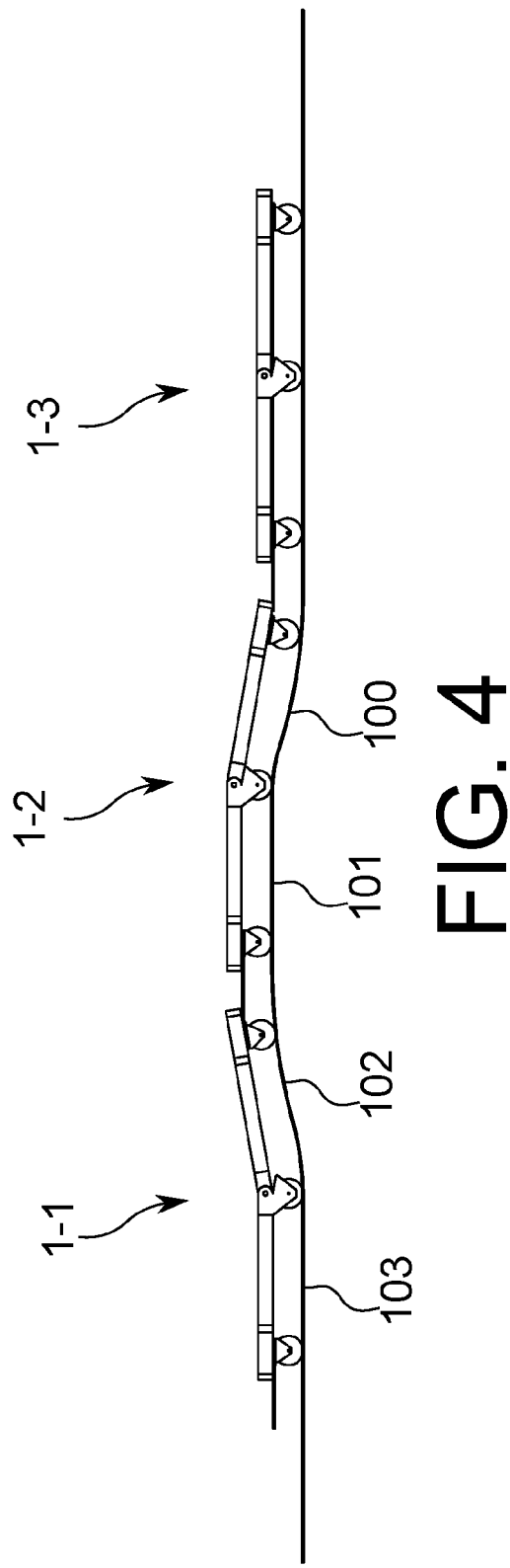

TRANSPORT WAGON

The present invention relates to a transport wagon consisting of a base frame, wherein the base frame comprises a rotatable bogie assembly on its front side for attachment to a powered tow or push truck and comprises one or more front steering wheels placed on the front side of the base frame and one or more rear steering wheels placed on the rear side of the base frame, wherein the one or more front steering wheels and the one or more rear steering wheels are coupled in such a way to the rotatable bogie assembly, that in operation the one or more front steering wheels rotate along with the rotatable bogie assembly and that the one or more rear steering wheels rotate in opposite direction with respect to the rotatable bogie assembly, wherein the base frame comprises at least one longitudinal beam to which a front cross beam, a rear cross beam and at least one intermediate cross beam are arranged with intermediate spaces, wherein at least one intermediate space is arranged for receiving goods, wherein an intermediate wheel suspension with two or more intermediate wheels is arranged under one or more of the intermediate cross beams.

The transport wagon according to the preamble is known in the art and is used in particular for transporting a plurality of transport carts, which can be loaded with goods. Multiple transport wagons are thereby coupled to each other to form a train of transport wagons, which are subsequently moved by a tow or push truck. Such a tow or push truck is also called a tugger train, but does not form part of the invention. During transport, each transport wagon is steered by means of a drawbar of the rotatable bogie assembly.

In the known transport wagon the front steering wheels, and also the rear steering wheels, are placed at a distance from the longitudinal axis. This has the advantage that the transport wagon is stable.

The known transport wagon with steerable wheels however has the disadvantage that the turning circle of the transport wagon is relatively large, and that the length of the transport wagon is relatively large.

The invention has for its object to provide a transport wagon according to the preamble, which lifts the mentioned disadvantages.

For this purpose, the transport wagon according to the invention is characterized in that the base frame is arranged to pivot about one or more pivot axes, each of which runs substantially parallel to at least one of the intermediate cross beams, the one or more front steering wheels are arranged substantially centrally under the front cross beam, the one or more rear steering wheels are arranged substantially centrally under the rear cross beam and the intermediate wheels are placed at a mutual distance from each other and form a triangle with both the one or more front steering wheels and the one or more rear steering wheels. These measures have the effect, that the inventive transport wagon has a smaller turning radius than the known transport wagon with four steerable wheels, and also has a shorter length.

Because the one or more front steering wheels form a triangle with the intermediate wheels and the base frame can pivot, the one or more front steering wheels will remain in contact with the ground at all times. Because the one or more rear steering wheels also form a triangle with the intermediate wheels and the base frame can pivot, the one or more rear steering wheels will remain in contact with the ground at all times. Moreover, these measures provide the inventive transport wagon stability, and also have the advantage that when the inventive transport wagon is pulled over an uneven floor, the base frame will pivot about at least one of the pivot axes. As a result, at least one of the front wheels, each intermediate wheel and at least one of the rear wheels will maintain contact with the floor, so that the transport wagon will still be steerable by means of the rotatable bogie assembly.

In the transport wagon according to the invention, the one or more front steering wheels are preferably arranged substantially centrally under the front cross beam. As a result, the transport wagon has a small turning circle. The intermediate wheels are preferably placed at a distance from each other, so that the intermediate wheels together with the one or more front steering wheels form a triangle. Because the base frame pivots over the pivot axis, the front part of the base frame will hereby remain in contact with the floor at all times and the transport wagon will always be steerable by means of the one or more front steering wheels.

In addition, in the transport wagon according to the invention, the one or more rear steering wheels are preferably arranged substantially centrally under the front cross beam. This allows the transport wagon to better follow the path of the front steering wheels via the one or more rear steering wheels. Here too, the intermediate wheels are preferably placed at a distance from each other, allowing the intermediate wheels together with the one or more rear steering wheels to form a triangle. Because the base frame pivots over the pivot axis, the rear portion of the base frame will consequently keep in contact with the floor at all times and the transport wagon will always be steerable through the one or more rear steering wheels.

In a first preferred embodiment of the transport wagon according to the invention, the at least one pivot axis is located above an intermediate wheel suspension. This has the advantage that the inventive transport wagon pivots above an unevenness in the floor and can better follow this unevenness.

In an elegant preferred embodiment of the inventive transport wagon, the base frame comprises at least two frame parts, wherein a space is formed in each frame part and successive frame parts are hinged to each other around a pivot axis. The use of frame parts facilitates the production and assembly of the transport wagon.

The base frame of the transport wagon according to the invention is preferably provided with one longitudinal beam. This makes it possible to place goods in the intermediate space via a side of the transport wagon facing away from the longitudinal beam.

In a particularly elegant preferred embodiment of the inventive transport wagon, the frame parts are generally U-shaped.

The intermediate wheels of the inventive transport wagon are preferably non-steering and function as course wheels.

In an efficient preferred embodiment of the transport wagon according to the invention, the transport wagon is provided with one intermediate wheel suspension, wherein the intermediate wheels are placed in the center of the base frame and the distance between the one or more front steering wheels and the intermediate wheels is equal to the distance between the intermediate wheels and the one or more rear steering wheels. This has the effect that in operation the intermediate wheels and the one or more rear steering wheels follow the same track as the front steering wheels.

The invention will be further explained with reference to the following figures, in which:

FIG. 4 shows three transport wagons according to the invention coupled to each other;

The same numbers in the different figures indicate the components.

Figure 1:
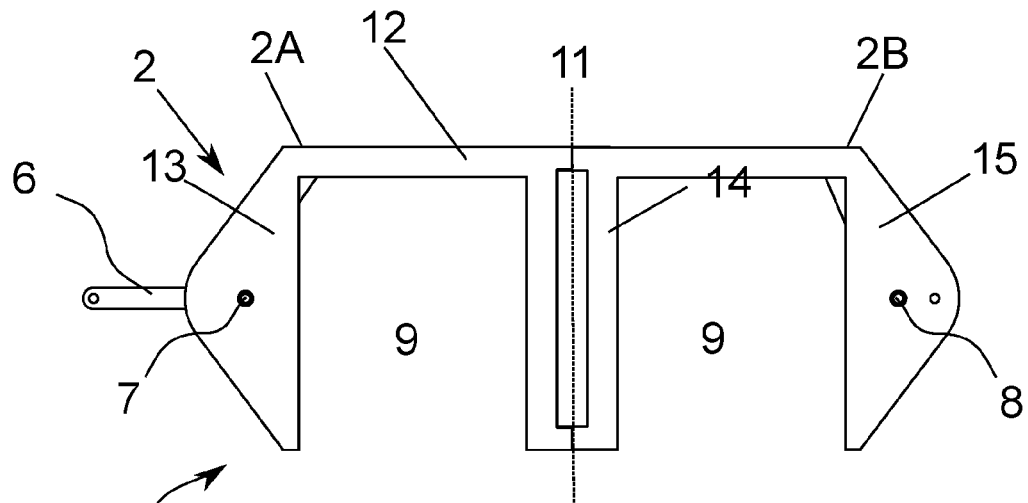
FIG. 1A shows a top view of a preferred embodiment of the transport wagon 1 according to the invention.
FIG. 1B shows a side view of a preferred embodiment of the transport wagon 1 according to the invention.
FIG. 1C shows a bottom view of a preferred embodiment of the transport wagon 1 according to the invention.
Figure 2:
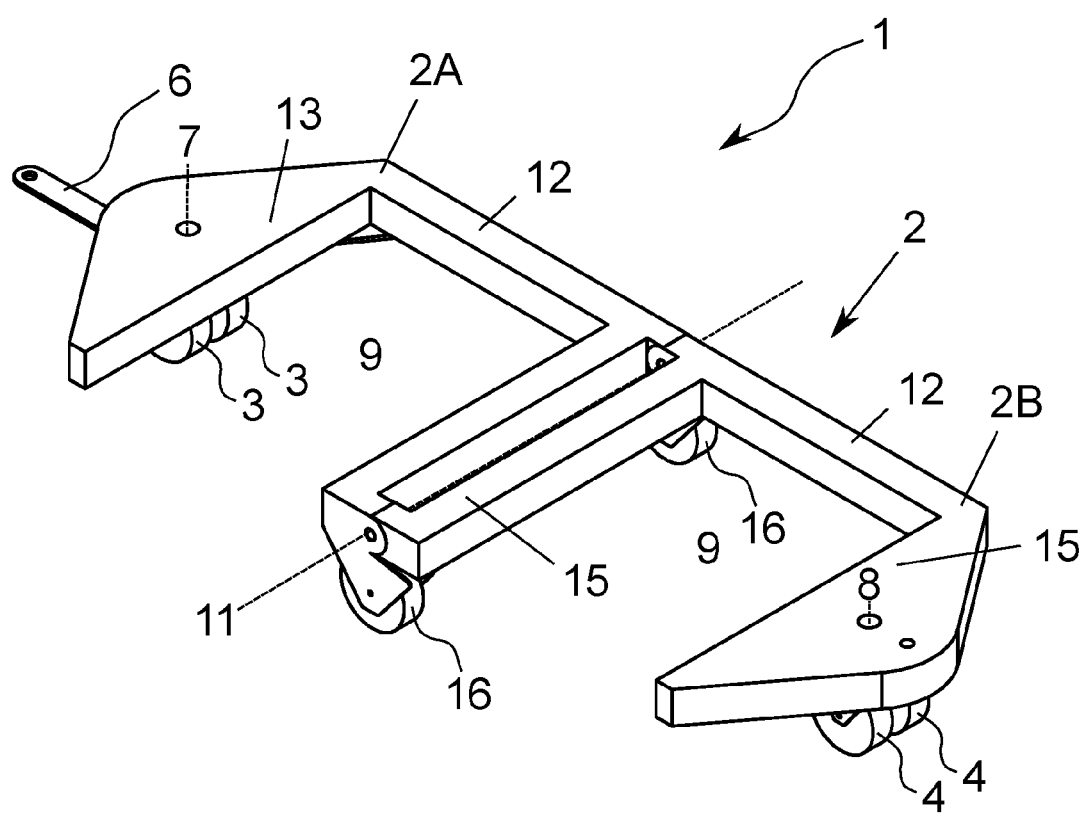
FIG. 2 shows an isometric view of the transport wagon according to FIGS. 1A, 1B and 1C.

FIGS. 1A, 1B and 1C show different 2D views of a preferred embodiment of the transport wagon 1 according to the invention. FIG. 2 shows an isometric view of the transport wagon 1 according to these figures. The sports wagon 1 essentially comprises a base frame 2, which is provided with front steering wheels 3 and rear steering wheels 4. The base frame 2 is provided with a rotatable bogie assembly at the front for coupling the transport truck 1 to a tow or push truck (not shown) The rotatable bogie assembly comprises a drawbar 6 for attachment to a driven tow or push truck. The front steering wheels 3 are connected to the rotatable bogie assembly by means of a front wheel suspension and have a common front wheel axle. The front steering wheels 3 are rotatable about the front pivot axis 7 by means of the drawbar 6. The rear steering wheels 4 are rotatable about a rear pivot axis 8 and in operation are steered in an opposite direction with respect to the front steering wheels 3. In the preferred embodiment shown, the rear steering wheels 4 are for this purpose connected to the rotatable bogie assembly by means of a rod assembly 5.

The base frame 2 comprises two adjacent generally U-shaped frame parts 2A; 2B, wherein an intermediate space 9 is formed in each frame part 2A; 2B. The intermediate space 9 can be used for placement of a cart with goods, which can be secured by known means.

The adjacent bases of the two U-shaped frame parts 2A, 2B form a longitudinal beam 12 of the base frame. The legs of the two U-shaped frame parts 2A, 2B form a front cross beam 13, an intermediate cross beam 14, and a rear cross beam 15.

Under the intermediate cross beam 14 by means of an intermediate wheel suspension intermediate wheels or course wheels 16 are arranged, which are not coupled to the rotatable bogie assembly. The course wheels are arranged at a mutual distance and form on the one hand a triangle with the front steering wheels 3 and on the other hand form a triangle with the rear steering wheels 4.

The two legs of the adjacent U-shaped frame parts 2A; 2B forming the intermediate cross beam 14, are by means of a pivot connection rotatably connected to each other about a pivot axis 11, wherein the pivot axis 11 runs substantially parallel to the intermediate cross beam 14. The pivot axis 11 is located near the top of the base frame 2 and above the intermediate wheel suspension. As a result, the frame parts 2A, 2B can at least partially rotate relative to each other.

The front steering wheels 3 are arranged substantially centrally under the front cross-beam 13.

The rear steering wheels 4 are arranged substantially centrally under the rear cross-beam 15.

Figure 3A:
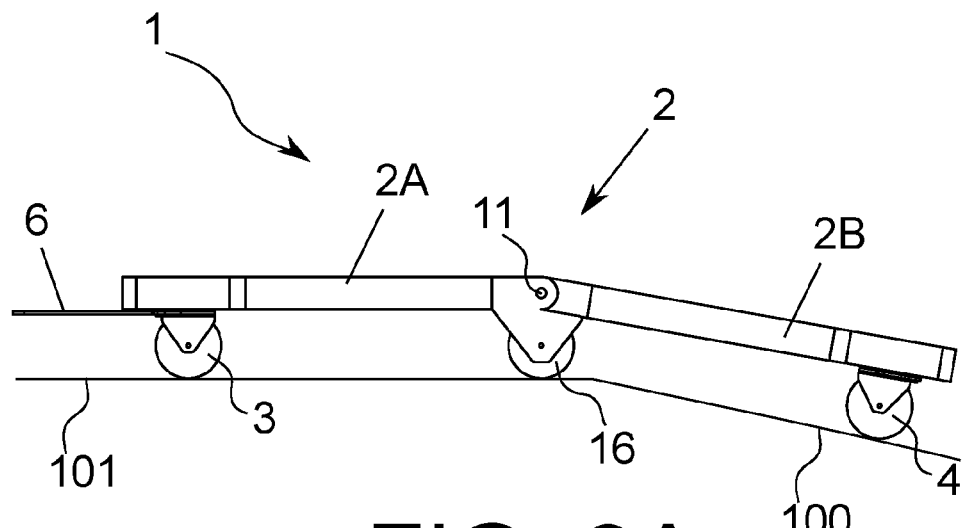
FIG. 3A and FIG. 3B show a preferred embodiment of the transport wagon according to the invention in an operating mode on different floors.
Figure 3B:
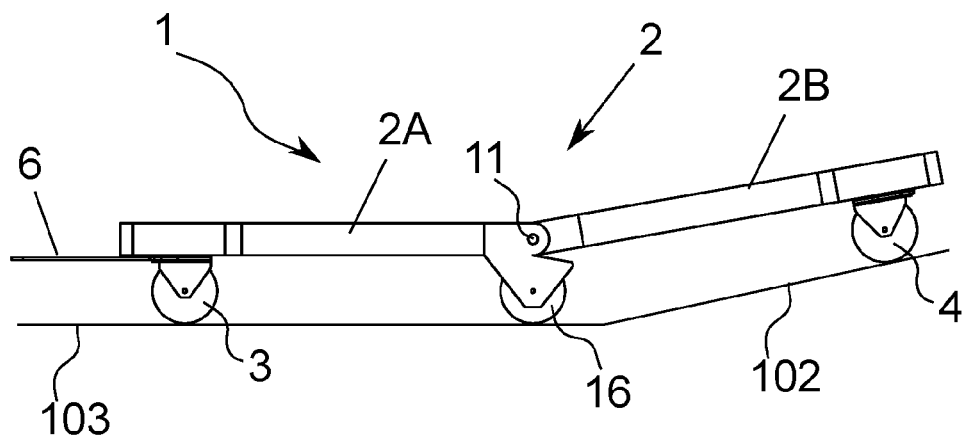

FIG. 3A and FIG. 3B show the transport wagon 1 according to the invention in an operating mode on different floors.

In FIG. 3A, the transport wagon 1 moves from right to left over a floor with an ascending portion 100 that turns into a flat portion 101. During movement over the transition between portions 101;102, the base frame 2 will pivot about pivot axis 11, whereby the rear side of the frame part 2B lies lower than the front side of the frame part 2A.

In FIG. 3B, the transport wagon 1 moves from right to left over a floor with a sloping portion 102 that turns into a flat portion 103. During movement over the transition between portions 102;103, the base frame 2 will pivot about pivot axis 11, whereby the rear side of the frame part 2B is located higher than the front side of the frame part 2A.

Because the front steering wheels 3 and the course wheels 16 are arranged in a triangle, each wheel 3;16 will remain in contact with the floor. Since the rear steering wheels 4 and the course wheels 16 are also arranged in a triangle, the rear steering wheels 4 will also remain in contact with the floor.

FIG. 4 shows three mutually coupled transport wagons 1-1; 1-2; 1-3 according to the invention, whereby the transport wagons are pulled over an uneven floor by a tow or push truck (not shown) from the right to the left in the figure. Each wheel of the transport wagon 1-1; 1-2; 1-3 will remain in contact with the floor while moving over the unevenness (100; 101; 102) in the floor.

Figure 5:
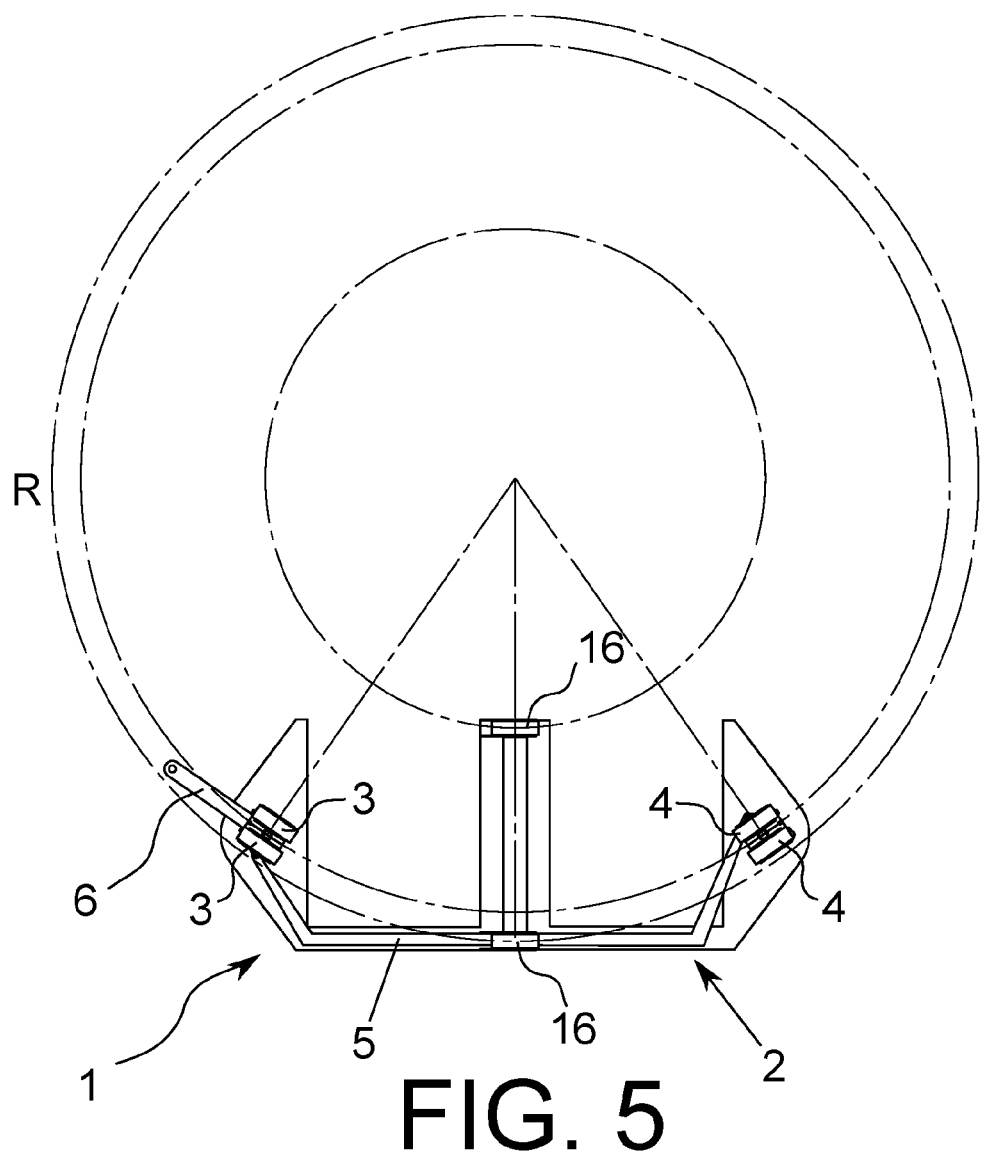
FIG. 5 shows a bottom view of the transport wagon according to the invention, wherein the effect of the counter steering rear wheels 4 is shown.

FIG. 5 shows a bottom view of the transport wagon 1 according to the invention, in which the effect of the counter steering rear wheels 4 is shown in which all wheels have a central pivot point. The rear wheels 4 are connected to the rotatable bogie assembly via the rod assembly 5 such that the rear wheels 4 steer in an opposite direction with respect to the front wheels 3. This results in the transport wagon having a relatively small outer turning circle R, the intermediate wheels 16 acting as course wheels. The course wheels 16 support the transport wagon 1 in following the turning circle, the course wheels 16 having no influence on the size of the turning circle. As an alternative to the rod assembly 5, the rear steering wheels 4 can be provided with an actuator and a control for the actuator (both not shown), which are arranged to steer the rear steering wheels 4 in an opposite direction with respect to the front steering wheels 3 in operation. Another alternative to the rod assembly 5 is a connection between the front wheels 3 and rear wheels 4 by means of one or more chains or cables.

The distance between the front steering wheels 3 and the course wheels 16 is preferably equal to the distance between the course wheels 16 and the rear steering wheels 4. As a result, all said wheels 3; 4;16 have the same turning circle and the course wheels 16 and the rear steering wheels 4 follow the track of the front steering wheels 3.

The invention is of course not limited to the described and shown preferred embodiment but extends to any embodiment falling within the scope of protection as defined in the claims and as seen in the light of the foregoing description and accompanying drawings.

The invention claimed is:

1. A transport wagon comprising a base frame, wherein the base frame comprises a rotatable bogie assembly on its front side for attachment to a powered tow or push truck and comprises one or more front steering wheels placed on the front side of the base frame and one or more rear steering wheels placed on the rear side of the base frame, wherein the one or more front steering wheels and the one or more rear steering wheels are coupled in such a way to the rotatable bogie assembly, that in operation the one or more front steering wheels rotate along with the rotatable bogie assembly and that the one or more rear steering wheels rotate in the opposite direction with respect to the rotatable bogie assembly, wherein the base frame comprises at least one longitudinal beam to which a front cross beam, a rear cross beam and at least one intermediate cross beam are arranged with intermediate spaces, wherein at least one intermediate space is arranged for receiving goods, wherein an intermediate wheel suspension with two or more intermediate wheels is arranged under one or more of the intermediate cross beams, characterized in that the base frame is arranged to pivot about one or more pivot axes, each of which runs substantially parallel to at least one of the intermediate cross beams, the one or more front steering wheels are arranged substantially centrally under the front cross beam, the one or more rear steering wheels are arranged substantially centrally under the rear cross beam and the intermediate wheels are placed at a mutual distance from each other and form a triangle with both the one or more front steering wheels and the one or more rear steering wheels.

2. The transport wagon according to claim 1, wherein at least one pivot axis is located above an intermediate wheel suspension.

3. The transport wagon according to claim 1, wherein the pivot axis is located near the top of the base frame.

4. The transport wagon according to claim 1, wherein the base frame comprises at least two frame parts, wherein at least one intermediate space is formed in each frame part and successive frame parts are hinged to each other around a pivot axis.

5. The transport wagon according to claim 1, wherein the base frame is provided with one longitudinal beam.

6. The transport wagon according to claim 5, wherein the frame parts are generally U-shaped.

7. The transport wagon according to claim 1, wherein the intermediate wheels are non-steering.

8. The transport wagon according to claim 1, wherein the transport wagon is provided with one intermediate wheel suspension, wherein the intermediate wheels are placed in the center of the base frame and the distance between the one or more front steering wheels and the intermediate wheels is equal to the distance between the intermediate wheels and the one or more rear steering wheels.

\* \* \* \* \*